July 11, 1939.  F. D. JONES  2,165,859
POWER LIFT IMPLEMENT
Filed Oct. 9, 1936  2 Sheets-Sheet 1
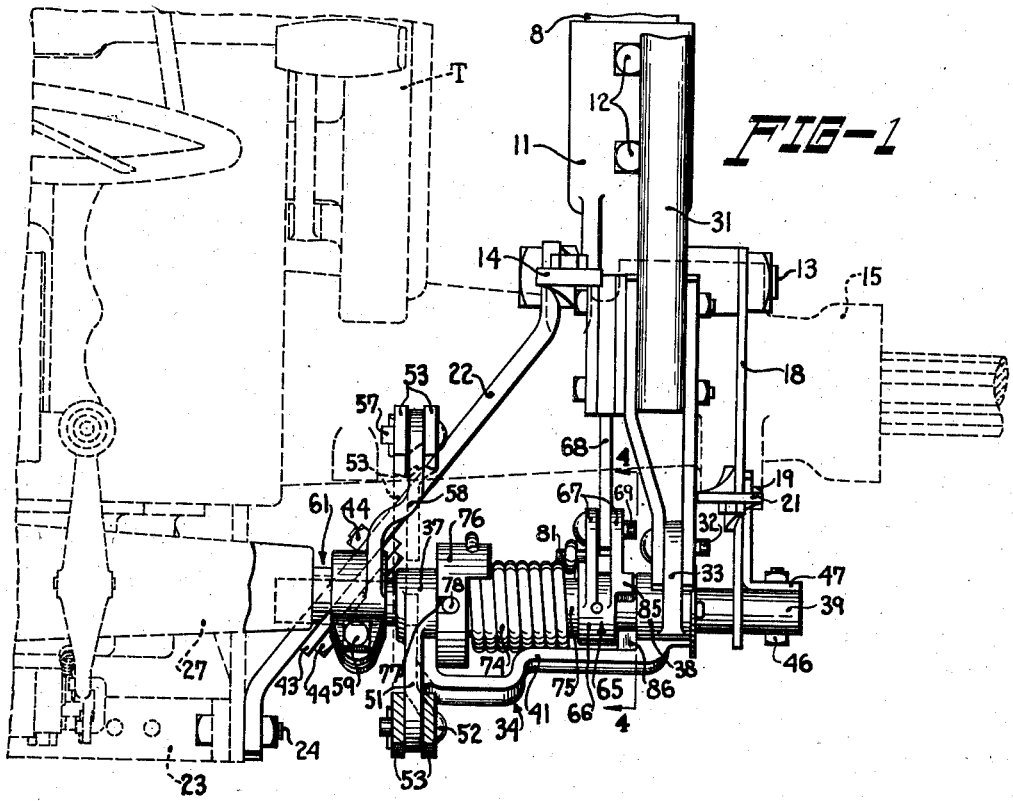
INVENTOR
BY Frank D. Jones.
Brown, Jackson, Boettcher & Dienner.
ATTORNEYS.

July 11, 1939.　　　　　F. D. JONES　　　　　2,165,859
POWER LIFT IMPLEMENT
Filed Oct. 9, 1936　　　　2 Sheets-Sheet 2
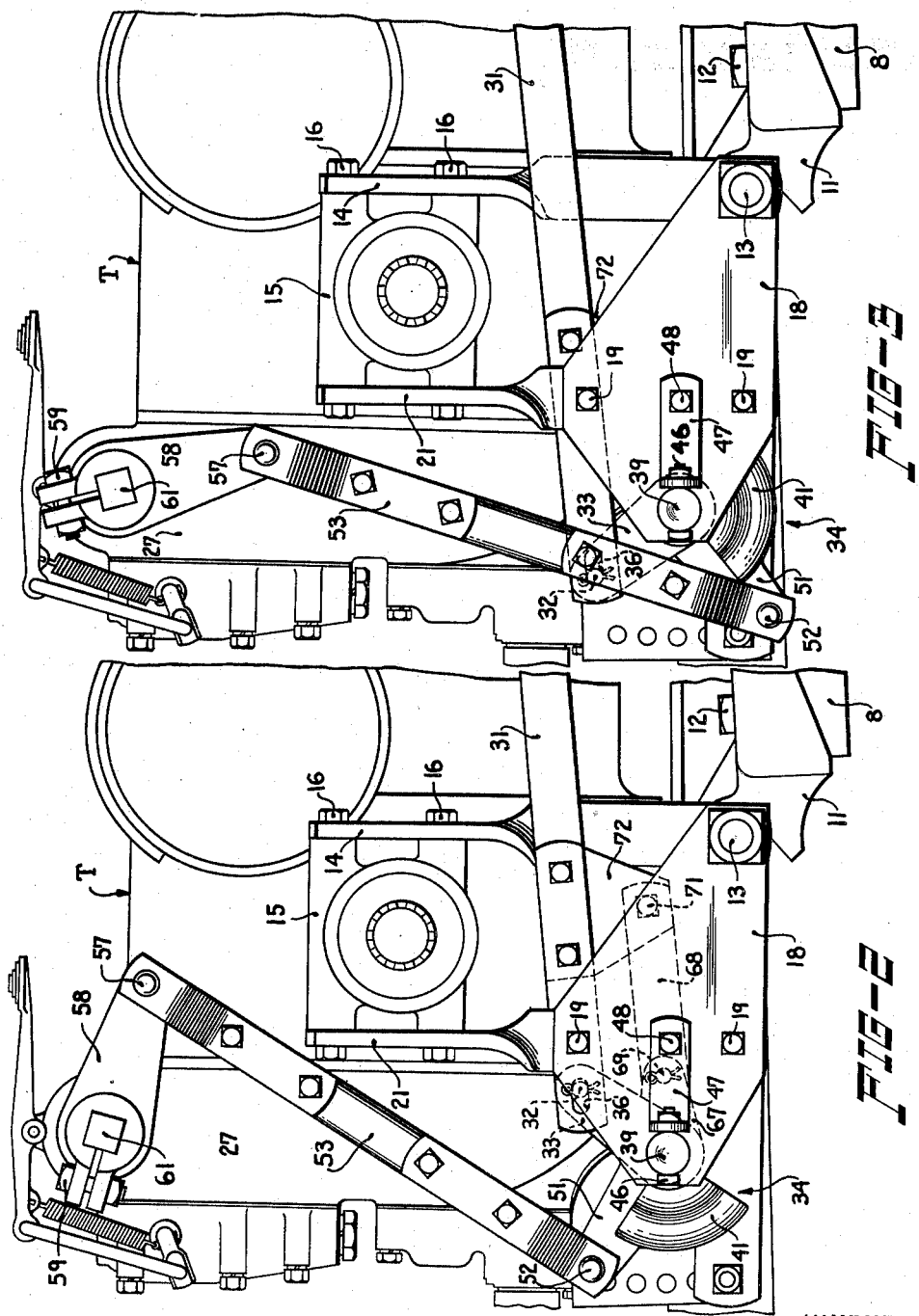
INVENTOR
BY Frank D. Jones,
Brown, Jackson, Boettcher & Dienner.
ATTORNEYS.

Patented July 11, 1939

2,165,859

UNITED STATES PATENT OFFICE 2,165,859

POWER LIFT IMPLEMENT

Frank D. Jones, Ottumwa, Iowa, assignor to Dain Manufacturing Company of Iowa, Ottumwa, Iowa, a corporation of Iowa Application October 9, 1936, Serial No. 104,748

23 Claims. (Cl. 56—27)

The present invention relates generally to agricultural implements and more particularly is concerned with implements that are connected with or supported on a tractor and in which the power for raising and lowering certain operating parts of the implement is derived from the tractor motor through hydraulic lift mechanism. However, where certain types of hydraulic lift mechanisms are employed, such as that illustrated and described in Patent No. 2,107,760 to Elmer McCormick, Milford D. Stewart and Wayne H. Worthington, the lifting rock shaft is locked only in its raised position, and as it is desirable in the operation of some types of agricultural implements to hold the working tools or equivalent devices in a lowered position as well as in a raised position it is necessary to provide special lifting connections to hold the implement in either its raised or its lowered position. An example of such an implement is a sweep rake wherein it is desirable to hold the rake in a lowered position to force the rake teeth to follow closely along the ground surface as well as to hold the rake in a raised position for transport, and in my pending application, Serial No. 13,234, filed March 27, 1935, which has matured into Patent No. 2,082,247, granted June 1, 1937, I have illustrated and described one type of such special lifting connections between the power lift mechanism of the tractor and the lifting rock shaft of a sweep rake.

It has been found, however, that with the construction shown in such pending application the major portion of the work done by the power lift mechanism in raising the rake head occurs during the last part of the movement of such mechanism, and hence a much greater strain is imposed on the power lift mechanism than would be imposed upon it if the work of lifting the rake head could be distributed more uniformly over the full range of movement of such mechanism.

With the above in view, it is the principal object of the present invention to provide improved lifting connections between the power lift mechanism on the tractor and the lifting rock shaft of the implement whereby the work of the power lift mechanism in raising the rake head is distributed over practically the full movement of the power lift mechanism, and wherein such lifting connections are locked against movement when the rake head is in operating position.

Other objects and advantageous features will be apparent from the following description of the preferred embodiment of my invention taken in connection with the accompanying drawings, in which, Figure 1 is a top or plan view of the improved lifting connections at one side of the tractor, the parts of the lifting mechanism being shown in the positions they occupy when the rake head or other implement is in lowered position;

Figure 2 is a side elevational view of the lifting connections, as viewed from the right in Figure 1;

Figure 3 is a side elevational view similar to Figure 2, but showing the lifting connections in the positions they assume when the rake is in raised position;

Figure 4 is a longitudinal vertical sectional view taken substantially on the plane of the line 4—4 of Figure 1, showing the positions of the several parts when the rake is in operating position; and Figure 5 is a longitudinal vertical sectional view similar to Figure 4, showing the positions of the several parts when the rake is in raised position.

Referring now to the drawings, only such parts of a sweep rake applied to a tractor as are necessary to an understanding of the present invention have been illustrated therein, and reference may be had if desired to my prior Patent No. 1,967,774, granted to me on July 24, 1934, for a full showing and description of a tractor propelled sweep rake of the type with which the lifting connections of my present invention are adapted to be employed.

In the drawings of the present application only one of the two longitudinally extending frame or pushing members 8 of a sweep rake have been illustrated. These two pushing members 8 are disposed on opposite sides of the tractor T and have their rear ends connected to and supported on the tractor in substantially the same way, and, therefore, the mounting of but one of said members is shown and will be described herein. A suitable journal casting 11 is fixed to the rear end of the member 8 by means of bolts 12 (Figures 1, 2 and 3). This journal casting is removably connected with and journaled upon a transversely extending pivot pin or bolt 13 supported by means of a bracket 14 secured to the rear axle housing 15 of the tractor by means of bolts 16 (see Figures 2 and 3). This pivot pin 13 extends through alined perforations in the lower portion of the bracket 14 and the lower portion of a generally triangular plate or frame member 18 which is bolted as shown at 19 to the lower end of a bracket or frame member 21 (see Figures 2 and 3). The lower end of the plate 18 is spaced from the lower end of the bracket 14, and the journal casting 11 is journaled on the pivot pin 13 between said bracket and said plate. The bracket 14 is braced by means of a suitable brace bar or member 22 having one end bolted or otherwise suitably secured to the lower end of the bracket 14 and having its other end secured to the draw bar 23 of the tractor by a bolt 24 (Figure 1).

As described in my pending application above referred to, the rake head is adapted to be rocked or tilted about a transversely extending axis to raise and lower the front ends of the rake teeth, and to this end it is operatively connected to a transversely extending rock shaft suitably supported on the tractor, whereby by the rocking of said rock shaft the rake head may be tilted. This rock shaft, which is not illustrated in the accompanying drawings as it has nothing to do with the present invention, is operated by power derived from the hydraulic lift mechanism 27 on the tractor by means of two substantially identical sets of connections, one set being disposed on each side of the tractor.

As the two sets of connections between the hydraulic lift mechanism and the lifting rock shaft are identical in construction, but one of such sets of connections will be described herein. As shown, the lifting connections of the present application include a longitudinally extending operating member or link 31 which at its forward end is adapted to be operatively connected to the implement actuating rock shaft (not shown) whereby said rock shaft will be rocked upon actuation of said link. The rear end of the link 31 is pivotally connected by means of a pin 32 to the upper end of an arm 33 cast integral with a member 34 (Figure 1), the pin 32 extending into a slot 36 adjacent the rear end of the link 31, as best shown in Figures 2 and 3. The member 34, as shown in Figure 1, comprises a single casting having a pair of spaced bearings or hub members 37 and 38 by which said member is journaled on a fixed supporting pin or shaft 39, and said hub members 37 and 38 are integrally connected by means of a bridging member 41. The arm 33 before referred to is preferably but not necessarily formed integral with the hub 38 of the member 34.

The pin or shaft 39 is supported at its inner end in a perforation in a bracket 43 fixedly connected to the brace bar 22 by means of bolts 44 and extending upwardly therefrom as shown in Figures 1 and 4, and adjacent its outer end the shaft 39 extends through a perforation in the plate 18. The shaft 39 is fixed in position in the plate 18 by means of a bolt 46 extending through a perforation in the shaft 39 and through a perforation in one arm of an angle bracket 47, the other arm of said bracket being secured to the plate 18 by a bolt 48 (see Figures 2 and 3).

Formed integral with and extending outwardly from the hub member 37 is an arm 51, the outer end of which is pivotally connected at 52 to the lower end of a link 53 and the upper end of which is pivotally connected at 57 with the outer end of an arm 58 fixedly connected at its inner end, as shown at 59, to the outer end of the lifting rock shaft 61 of the hydraulic power lift mechanism. The member 41, in effect, serves as a pivotally mounted connecting bell crank having arm portions 33 and 51.

Through the lifting connections so far described the implement rock shaft is rocked to move the rake head or other implement part connected to the rock shaft from an operative position into a raised position when the power lift is actuated and the power lift arm 58 is moved from the position shown in Figure 2 to the position shown in Figure 3. Figures 4 and 5 also show the parts in operating and raised position, respectively.

In Figure 3 the lifting connections are shown in the positions they occupy when the rake head is in its lifted or transport position, and when the power lift is tripped to permit the rake head to drop to raking position the parts assume the positions approximately like those shown in Figure 2. When the parts are in the position shown in Figure 2 it is desirable to provide means for locking them in such position, as the hydraulic power lift mechanism is not locked when the parts are in such position. This means includes a member 65 comprising a hub portion 66 by which said member is journaled on the pin or shaft 39 adjacent to and on the inner side of the bearing hub 38 before described. Formed integral with the member 65 and extending outwardly therefrom are two spaced arms 67, and one end of a link 68 is pivotally connected between the outer ends of said arms 67 as by means of a pivot pin 69. The opposite end of the link 68 is pivotally connected as shown at 71 to the lower end of a bracket 72 fixed to move with and depending from the lifting member 31.

The member 65 is urged to rotate in a clockwise direction, as viewed in Figures 2 to 5, by means of a torsion spring 74 (Figure 1). This spring is supported upon a cylindrical casting or sleeve member 75 mounted upon the pin or shaft 39 between the member 65 and the hub member 37 of the member 34. The end of the casting 75 adjacent the hub 37 is provided with a radially extending flange 76 formed integral therewith and having two transversely extending slots or recesses 77 in its outer surface extending at right angles to each other, each of said recesses being adapted to receive a bolt 78 which passes through a perforation provided in the fixed shaft 39. The purpose of this bolt and slot construction is to serve as an adjustable anchor for the inner end of the spring 74, and also as means for adjusting the tension of the spring, but as it is fully illustrated and described in my said pending application above referred to it is not believed necessary to describe it more specifically herein. The spring 74 is connected at its outer end to a pin 81 projecting inwardly from the inner arm 67, and the inner end of the spring is looped around a lug 82 on the flange 76 of the casting 75. Extending outwardly from the outer arm 67 of the member 65 is a lug 85 and extending inwardly from the member 34 adjacent the bearing portion 38 is a lug 86, said lugs being adapted to move into contacting engagement in the lowering operation of the rake head as hereinafter described.

The rake head or other implement part is lowered by tripping the power lift, which opens a valve and permits the arms 51 to swing upwardly from the position shown in Figures 3 and 5 under the effect of the weight of the rake head, transmitted to the arms 33 by the links 31, said links, in this operation, moving in a forward direction. Coincidentally with such movement the links 68 are moved forward by reason of their connection with the links 31 through the brackets 72, and the arms 67 of the members 65 that are connected with the links 68 are moved in a clockwise direction. These several parts are also urged in such movement by the torsion springs 74, and when the arms 67 and links 68 reach a dead center position, or slightly beyond a dead center position, which is the lowered or operating position of the rake head as shown in Figures 2 and 4, the parts are locked in such position. The springs 74, which bias the parts for movement into this position, can then exert sufficient force against any rearward thrust imposed thereon by the links 31 so as to hold the lifting connections in this position and the rake teeth down against the ground. Thus the arms 67 and link 68 serve as toggle link means operative to hold the implement part in one position, but not requiring that the lifting arm 33 move into a dead center relationship with the link 31.

The springs 74 are arranged to aid in moving the several parts toward and holding them in the position shown in Figures 2 and 4, after the power lift has been actuated to move the rake head and associated parts to lowered position. Hence, with the present construction it is not necessary to rely upon the power lift mechanism itself to hold the rake head down, since a rearward thrust on the links 31 is prevented by the aforesaid dead center locking mechanism from exerting any great amount of turning effect upon the arms 51.

When the rake head is in lowered or operating position with the arms 67 and links 68 in dead center locking relationship as shown in Figures 2 and 4, the lug 85 on each of the outer arms 67 of the members 65 is in engagement with the lug 86 on the bearing portion 38 of the member 34, and when the power lift is actuated to raise the rake head to inoperative position the first part of the movement of the members 34 in a counterclockwise direction as viewed in Figures 2 and 4 causes a rotation of the members 65 in a counterclockwise direction by means of the lugs 86 on the members 34 applying force in a counterclockwise direction against the lugs 85 and thereby swinging the integral arms 67 in a counterclockwise direction to break the dead center lock between the arms 67 and the links 68. During this initial movement of the members 34, which is very small, substantially no longitudinal movement is imparted to the lifting links 31 that are connected to the lifting rock shaft of the implement, for during this initial movement of the members 34, the pins 32 on the arms 33 of the members 34 move toward the rear end of the slots 36 in the links 31. As soon as the pins 32 contact the rear end of the slots 36, further angular movement of the members 34 causes rearward longitudinal movement of the members 31, which, as above described, raises the rake head to inoperative position, and in this movement the arms 67 and the links 68 buckle into the position shown in Figure 5.

It is to be noted that in the present construction the arms 33 connected with the link members 31 that control the movement of the lifting rock shaft of the implement are so positioned as to make about the same angle with respect to the link members 31 in both the raised and lowered positions thereof, the arm 33 moving approximately 30° to each side of a line perpendicular to the link members 31. As a result of such construction, a substantially constant longitudinal movement of the link member 31 is produced during the full angular movement of the members 34, after the pin 32 contacts the rear end of the slot 36, and, therefore, full advantage is taken of the entire range of movement of the power lift mechanism.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

It is also to be understood that while I have illustrated and described my invention in connection with a sweep rake, the invention is also applicable to any other type of tractor implement having one or more operating members adapted to be raised and lowered, as will be readily apparent to those skilled in the art, and it will also be apparent that the principles of the present invention are equally applicable to machines having a manual lift instead of a power lift, or to the locking type of power lift to thereby relieve the power lift mechanism of the duty of holding the implement parts in a given position, or, indeed, to any mechanism to which it may be desirable to move parts to or hold them in a definite position.

What I claim is:—

1. The combination with a tractor having a hydraulic lift mechanism, of means connected with said hydraulic lift mechanism including operating members, means connecting said members with said power lift mechanism whereby said members are adapted to be moved into either of two positions by actuation of said mechanism, said mechanism being locked only in one position of said members, each of said connecting means including a shaft supported on the tractor, a member journaled on said shaft, an arm on said member connected with said hydraulic lift mechanism, and a second arm on said member connected with said operating member, and means for locking each of said operating members in their other position, said means comprising a hub member journaled on said shaft, an arm on said hub member, and a link connecting said arm with its operating member, said arm and said link being movable by said operating member into a dead center relationship in the other position of said hydraulic lift mechanism upon actuation of said operating member to such position.

2. The combination with an operating member and mechanism connected therewith for moving said member into either of two positions, of means serving as a pair of pivotally interconnected links, one of which is connected with said operating member and the other of which is pivotally anchored, said link means being movable into a dead center relationship to lock said member in one position after it has been moved by said mechanism to such position, spring means connected with said link means and tending to move said link means into such dead center locking relationship, and means connected with and movable by said mechanism into engagement with one of said links for moving said link means against the action of said spring means out of such dead center relationship upon movement of said operating member into its other position.

3. In combination, a longitudinally movable member movable into and out of one position, a rockably mounted arm normally disposed at an angle with respect to said member, lost motion connecting means extending between said arm and said member and providing for movement of said member by said arm with limited movement of said arm relative to said member, a link pivotally connected at one end with said member to move therewith, a second rockably mounted arm pivotally connected with the other end of said link and adapted to move into substantially dead center relationship therewith when said first arm is moved in one direction and acts through said lost motion connection to move said member into said one position, and means on said first arm engageable with said second arm whereby the latter and the link associated therewith are moved out of their dead center relationship when said first arm is actuated in its initial movement in the other direction to take up the lost motion in said lost motion connection to provide for movement of said member out of said one position.

4. An agricultural machine comprising an implement part movable from one position to another, means operatively connected with said implement part for moving the latter from one position to another, and separate means pivotally connected to and movable by said first mentioned means into substantially dead center relationship for holding said implement part in one of its positions when said implement part is moved into said one position by said moving means.

5. An agricultural machine comprising link means operatively connected to an implement part for moving the latter from one position to another, a second link means operatively connected to said first link means, and means pivotally connected with said second link means and movable into a dead center relationship with the latter when said part has been moved to one of its positions by said first link means, whereby said second link means serves to hold said first link means and said part in said one position.

6. Lift mechanism for an agricultural implement having a movable part comprising link means connected with said implement part for moving the latter from one position to another, a second links means operatively connected to said first link means, and an arm pivotally connected with said second link means and movable into a dead center relationship therewith when said part has been moved to one of its positions by said first link means, whereby said second link means and said arm serve to hold said first link means and said part in said one position.

7. Lift mechanism for an agricultural implement having a movable part comprising link means connected with said implement part for moving the latter from one position to another, means pivotally connected with said link means and adapted to be brought into a dead center relationship when said implement part has been moved by said link means to one of its positions, whereby said second means serves to hold said link means and said part in said one position, and spring means connected with said second means and tending to move the latter into said dead center relationship.

8. Lift mechanism for an agricultural implement having a movable part comprising link means connected with said movable part for moving the latter from one position to another, means operatively connected to said link means and movable thereby into a dead center relationship when said implement part has been moved to one of its positions, whereby said second means serves to hold said link means and said part in said one position, and means connected with said link means and said second means and progressively operative to first move said second means out of such dead center relationship and then to move said link means and shift the implement part to its other position.

9. Lift mechanism for an agricultural implement having a movable part comprising a link connected with said implement part for moving the latter from one position to another, means including a rockably mounted arm connected with said link and normally disposed at an angle with respect thereto for shifting said link, a second link pivotally connected with said first link to move therewith, and means including an arm movable with said first arm and pivotally connected with said second link so as to move into substantially dead center relationship therewith when said first arm acts through said first link to move the implement part in to one position.

10. Lift mechanism for an agricultural implement having a movable part comprising means connected with said implement part for moving the latter from one position to another, a rockably mounted arm normally disposed at an angle with respect to said means for shifting the latter, means providing a lost motion connection between said arm and said means, a link connected to move with said first means, an arm movable with said first arm and pivotally connected with said link so as to move into substantially dead center relationship therewith when said first arm is moved in one direction and acts through said lost motion connection with said means to move said implement part into one position, and cooperating means on said arms for moving said second arm out of said dead center relationship with said link when the initial movement of said first arm in the other direction takes up the lost motion in said lost motion connection.

11. The combination with a tractor having a power lift, and means connected with said power lift and with an implement part for moving the latter from one position to another including link means through which the force moving said part is transmitted, of a pair of pivotally interconnected members, one operatively connected to said link means and movable by the latter to shift both of said pivotally interconnected members into a dead center relationship when said power lift has acted through said link means to move said part to one position, whereby said link means and said part are held in said one position independently of said power lift.

12. The combination with a tractor having a power lift, and means connected with said power lift and with an implement part for moving the latter from one position to another including link means through which the force moving said part is transmitted, of a pair of pivotally interconnected parts, one operatively connected to said link means and movable by the latter to shift said pivotally interconnected parts into a dead center relationship to provide a toggle lock when said power lift has acted through said link means to move said implement part to one position, whereby said link means and said implement part are held in said one position independently of said power lift, and means on said link means engageable with the other of said pivotally interconnected parts, whereby said link means moves said pivotally interconnected parts to break said toggle lock when said power lift has acted through said link means to move said implement part to its other position.

13. The combination with a tractor having a power lift, means connected with said power lift comprising longitudinally extending link means adapted to be operatively connected to an implement part to move the latter from one position to another, and means serving as a bell-crank having one arm portion pivotally connected with said link means and its other arm portion pivotally connected with said power lift, of a second arm mounted coaxially with said bell-crank means, and a second link means pivotally connected with said first link means and with said second arm whereby when said first link means is moved into one position by said bell-crank said second link means and said second arm move into a dead center relationship to lock said first link means in said one position.

14. The combination with a tractor having a power lift mechanism, and means connected with said power lift mechanism including operating members adapted to be moved into either of two positions, of means including a rotatable member connecting each of said operating members with said power lift mechanism whereby said operating members are moved to said two positions by actuation of said mechanism, said mechanism being locked only in one position of said operating members, means connected with said operating members for locking said members in their other position, and means on said rotatable member engageable with said last mentioned locking means for moving the latter out of locking relationship with said operating members when the latter are moved to said one position.

15. The combination with a tractor having a power lift mechanism, means connected with said power lift mechanism including operating members adapted to be moved into either of two positions, and means connecting said members with said power lift mechanism whereby said members are moved to said two positions by actuation of said mechanism, of means connected with said operating members and movable into a dead center relationship for locking said members in one position, a spring connected with the latter means for holding the same in such dead center relationship, and means formed integral with said second mentioned means and movable into engagement with said last mentioned means for moving the latter means out of dead center relationship against the action of said spring when said operating members are moved to their other position.

16. The combination with a tractor having a hydraulic lift mechanism, of means connected with said hydraulic lift mechanism including operating members, means connecting said members with said hydraulic lift mechanism whereby said members are adapted to be moved into either of two positions by actuation of said mechanism, said mechanism being locked only in one position of said members, each of said connecting means including a shaft supported on the tractor, a member journaled on said shaft, an arm on said member connected with said hydraulic lift mechanism, and a second arm on said member connected with the associated operating member, and means for locking each of said operating members in their other position, said means comprising a hub member journaled on said shaft, an arm on said hub member, a link connecting said last mentioned arm with its associated operating member, said last mentioned arm and said link being movable by said operating member into a dead center relationship in the other position of said hydraulic lift mechanism upon actuation of said operating member to such position, a spring connected to said last mentioned arm for holding the latter and said link in such dead center relation, and a lug on said hub member adapted to be contacted by a lug on said second arm for moving said hub member arm and said link out of dead center relationship against the action of said spring upon movement of said hydraulic lift mechanism to its other position.

17. Lift mechanism comprising a link for moving an implement part from one position to another, means including a rockably mounted arm connected with said link and normally disposed at an angle with respect thereto for shifting said link, a second link pivotally connected with said first link to move therewith, and means including an arm movable with said first arm and pivotally connected with said second link for movement relative thereto about an axis spaced from the pivot axis of said first and second links, said arm and second link moving into substantially alined dead center relationship when said first arm acts through said first link to move the implement part into one position, whereby said first arm moves through only a comparatively small angle in shifting said second arm out of dead center relationship with said second link, and the work of moving said first link and said implement is distributed substantially over the full movement of the first arm.

18. Lift mechanism comprising a link for moving an implement part into and out of operating position, means including a rockably mounted arm movable from one position to another and having a lost motion connection with said link for shifting the latter and providing means for a limited amount of movement of the arm relative to the link, a second link connected with said first link to move therewith, and means including an arm movable with said first arm and pivotally connected with said second link, the angular relation between said second link and said second arm being such that said second link and said second arm assume a dead center relationship and said first arm is disposed at a right angle with said first link when said rockably mounted arm is substantially midway between its two positions in shifting the implement part into and out of its operating position, whereby after said second arm and second link are moved out of dead center relationship the work of shifting said first link to raise the implement part out of its operating position is distributed substantially uniformly throughout the remainder of the movement of said rockably mounted arm.

19. The combination with an operating member movable into and out of one position, and mechanism connected with said member for moving the latter into said one position, of means serving as a pair of pivotally interconnected links connected with said operating member and movable into a dead center relationship to lock said member in said one position after it has been moved by said mechanism to said one position, means acting against at least one of said links for moving them out of said dead center relationship for releasing said link means and providing for movement of said operating member out of said one position when said mechanism is actuated to move said member out of said one position, and means actuated by said mechanism for controlling said means that acts against at least one of said links.

20. The combination with an operating member movable into and out of either of two positions, and mechanism connected with said member for moving the latter, of means serving as a pair of pivotally interconnected links connected with said operating member and movable into a dead center relationship to lock said member in one position when it is moved to such position by movement of said mechanism in one direction, spring means connected with said link means for holding the latter in such dead center locking relationship, and means controlled by movement of said mechanism in the other direction and acting against at least one of said links for moving them out of said dead center relationship and against the force of said spring means to provide for the movement of said operating member into its other position when said mechanism is actuated to move said member into its other position.

21. In a lift mechanism for an agricultural implement having a frame, a part movably mounted thereon, and link means connected with said part for moving the latter from one position to another, the combination of locking means operatively connected to move with said link means and adapted to react against said frame when said implement part has been moved to one of its positions, whereby said locking means serves to hold said link means and said part in said one position, and means connected with said link means and progressively operative to first move said locking means out of locking relationship and then to move said link means and shift the implement part to its other position.

22. In a tractor having a frame, a power lift, means connected with said power lift and adapted to move an implement part from one position to another, said means including link means connected with said part and through which the force moving said part is transmitted, and pivotally interconnected link means operatively connected to said frame and said first link means and movable by the latter into a dead center relationship when said power lift has acted through said first link means to move said part to one position, whereby said first link means and said part are held in said one position independently of said power lift.

23. In a tractor having a frame, a power lift, means connected with said power lift and adapted to move an implement part from one position to another, said means including link means connected with said part and through which the force moving said part is transmitted, pivotally interconnected link means operatively connected to said frame and said first link means and movable by the latter into a dead center relationship to provide a toggle lock when said power lift has acted through said first link means to move said part to one position, whereby said first link means and said part are held in said one position independently of said power lift, and means on said first link means movable into engagement with said pivotally interconnected link means for moving the latter to break said toggle lock when said power lift acts through said first link means to move said implement part to its other position.

FRANK D. JONES.